United States Patent

[11] 3,585,424

[72] Inventor Maurice Jean Neel
    Paris, France
[21] Appl. No. 6,355
[22] Filed Jan. 28, 1970
[45] Patented June 15, 1971
[73] Assignee Ste Jaz S. A.
    Paris, France
    Continuation-in-part of application Ser. No.
    680,909, Nov. 6, 1967, now abandoned.

[54] ELECTROMECHANICAL OSCILLATOR WITH
    FREQUENCY ADJUSTMENT MEANS
    7 Claims, 8 Drawing Figs.
[52] U.S. Cl............................................. 310/25,
    58/23, 84/409
[51] Int. Cl...................................................H02k 33/02
[50] Field of Search........................................... 310/25;
    84/409, 457; 58/23, 116; 331/156

[56] References Cited
UNITED STATES PATENTS

| | | | |
|---|---|---|---|
| 2,628,343 | 2/1953 | Murray........................ | 310/25 X |
| 2,928,308 | 3/1960 | Godbey....................... | 84/409 X |
| 3,506,897 | 4/1970 | Clifford....................... | 310/25 X |
| 3,338,047 | 8/1967 | Kueffer........................ | 58/23 |
| 1,280,239 | 8/1918 | Kitching...................... | 84/409 |

Primary Examiner—D. X. Sliney
Assistant Examiner—B. A. Reynolds
Attorney—Stevens, Davis, Miller and Mosher ABSTRACT: A mechanical oscillator comprising a two-armed vibrator element, and electrical vibration sensing and actuating coils disposed between the arms of the vibrator. A magnet is movably disposed between the two coils for fine frequency adjustment and movable pieces are placed on both arms of the vibrator to permit coarse adjustment of frequency without requiring any removal of matter.

INVENTOR
MAURICE JEAN NEEL

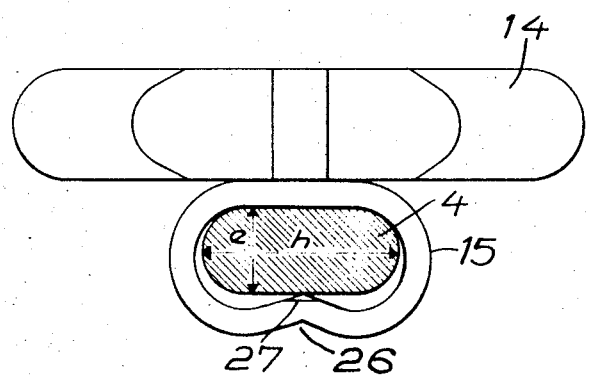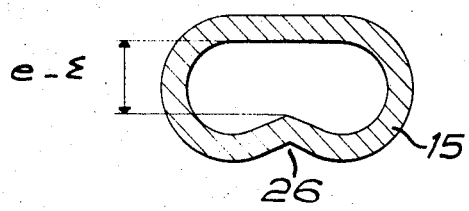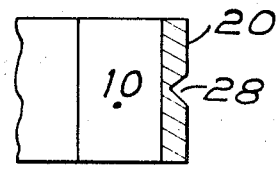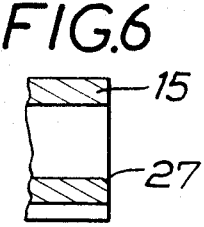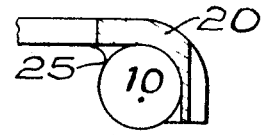

ELECTROMECHANICAL OSCILLATOR WITH FREQUENCY ADJUSTMENT MEANS

This application is a Continuation-in-Part of my application Ser. No. 680,909, filed Nov. 6, 1967, and now abandoned.

The present invention relates to an electromechanical oscillator including a device for inducing vibrations therein.

Mechanical oscillators are known in which the vibrations are induced in a two-armed vibrator member by two electrical coils wound respectively on two magnets disposed outside the two arms but adjacent thereto. One of the coils is a vibration sensing coil; signals from which are applied, after amplification, to the other (actuating) coil, which engenders the vibrations in the vibrator element.

According to the present invention, a mechanical oscillator comprises a two-armed vibrator element and electrical vibration sensing and actuating coils disposed between the arms of the vibrator element; the signal from the sensing coil being fed to the actuating coil through an electronic amplifier.

To enable the frequency of the vibrations to be varied, a magnet is disposed between the arms of the vibrator element and arranged to be displaced along an axis perpendicular to the longitudinal axis of the vibrator element.

It is an object of the present invention to produce a movement which may be used, for example, in a timepiece, utilizing an oscillator vibrating at elevated frequencies; as well as to obtain an oscillator having a greater stability of the frequency. Although it is known in the art to use oscillators of the same class to improve the stability of a clocklike movement, the oscillator of the present invention has an improved coefficient of quality which may be efficiently attained by increasing the frequency of the oscillator.

An oscillator of the spiral balance type of frequency 2.5 Hz. has a Q-factor of about 200, whilst a vibrator element of the mechanical oscillator type vibrating at 300 Hz. may very easily reach a Q-factor of 2,000.

It is a further object of the present invention to produce a movement as above described in which the oscillator occupies little space, thus creating a minimum obstruction for other parts located thereabout. In carrying out this object, the present invention contemplates utilizing a tuning fork having the elements which react to the vibrations thereof located between its branches. This arrangement provides an additional advantage, in that the vibrator movement is maintained in a symmetrical relationship, and the reaction on the support thereof (residual vibration) is accordingly reduced to a minimum.

It is a still further object of the present invention to produce a vibrator movement having the above-described features in which the net cost of manufacture and maintenance is as low as possible. In so doing, the movement of the present invention is simple as possible, with a minimum number of pieces; and is capable of being produced by standardized production methods, i.e., tolerance limits for the pieces of the assembly are easy to maintain. The instant invention also permits the adjustment of frequency of the oscillator without any removal of material therefrom.

By far, the greatest advantage of the present invention over oscillators of the same general class previously known in the art, is the provision therein of means for adjusting the frequency thereof without removing any material from the oscillator element.

Further objects and advantages of the instant invention will become apparent upon referring to the accompanying drawing, in which:

FIG. 4 is a fragmentary view showing a C-shaped guiding magnet mounted on one of the tuning fork's branches;

FIG. 5 is a sectional transversal view of the tightening ring adapted to move along the edge of the tuning fork;

FIG. 6 is a fragmentary longitudinal view of the tightening ring of FIG. 5;

FIG. 7 is a fragmentary view showing in detail the mounting of the magnet on its support; and FIG. 8 is a plan view perpendicular to that of FIG. 7.

Figure 1:
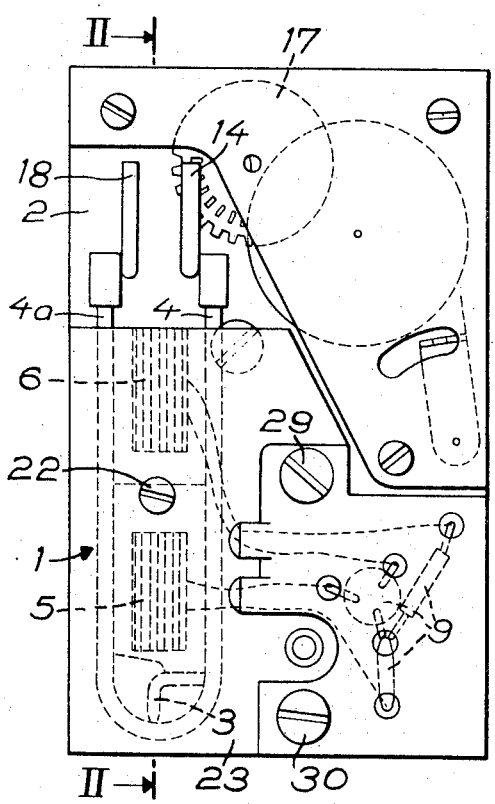
FIG. 1 is an elevational view of a vibrator assembly according to the present invention.
Figure 2:
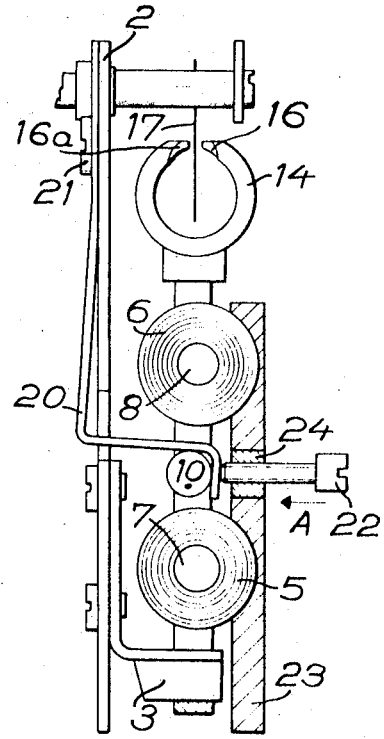
FIG. 2 is a sectional view taken along the line 2–2 in FIG. 1.

Turning to FIGS. 1 and 2, there is shown a mechanical oscillator having a vibrator element 1 which is fixed to a support member 2 by an arm 3. Element 1 has two arms, 4 and 4a, between which are disposed two coils, 5 and 6, wound respectively on magnets 7 and 8.

The sensing coil 5 is connected to the actuating coil 6 by an electronic amplifier 9 (preferably a transistor amplifier) of known type. This connection is shown by the dotted lines in FIG. 1 running from coil 6 through amplifier means 9 to coil 5.

A magnet 10 is fixed at one end of a thin spring plate 20, and plate 20 is mounted on support member 2 by means of screw 21. The positioning of spring plate 20 is such that magnet 10 is normally disposed between branches 4 and 4a of the vibrator element and is adapted to move between coils 5 and 6 in a direction perpendicular to the axes thereof.

As can be best seen from FIG. 2, a pointed screw 22 is threaded through front support member 23 (preferably through a restraining screw nut 24), and is adapted to bear against the end of spring means 20 to which magnet 10 is attached. Screw 20 may then be rotated inwardly or outwardly to adjust the position of the magnet between the two coils; the restraining screw nut 24 preventing the screw from being displaced while element 1 is vibrating.

As is shown in FIG. 7, the portion of spring 20 adapted to bear against the pointed end of screw 22 may be grooved at 28 in order to assure precise guidance of magnet 10, and also precise positioning of the pointed screw.

It is quite evident that the screw 22 and the elastic thin plate 20 should be made from a nonmagnetic material, so that the flux produced by magnet 10 will not be dispersed thereby. These two pieces will be advantageously made from brass. In this way, the frequency of the oscillator is not at all disturbed and it is possible to directly place magnet 10 in contact with the elastic thin plate 20 its fixation being assured by the glue 25.

With respect to support member 23, it is joined to support member 2 by screw means 29 and 30, and spring 20 may be mounted on support member 2 in such a manner that it lightly maintains pressure against said screw 22 even when the end thereof bearing magnet 10 is very close to the inner surface of support member 23.

Note that with this arrangement, the manufacturer may exactly adjust the frequency of the vibrator before the same leaves the factory either by screwing screw 22 inwardly or outwardly, and in a like manner, the user may also adjust the frequency of the vibrator to regulate the same according to his own observations.

In adjusting the frequency of the vibrator, magnet 10 is displaced by means of screw 22, causing a variation in the intensity of the magnetic field produced by magnets 7, 8, and 10, all located between the branches 4 and 4a of tuning fork 1. Preferably, each magnet is made from soft magnetic material.

The vibrator element 1 is generally made from an alloy of Elinvar so that the frequency should not depend to any great extent on temperature. This alloy is magnetically mild and the presence of the magnetic field created by magnets 7 and 8 of the vibration producing circuit causes, by attraction, an increase in the stiffness of the arms 4 and 4a and modification of the value of the Young's modulus of the Elinvar. It will thus be understood that the modification of the magnetic field can cause a modification of the frequency, at least within certain practical limits.

For a flexible U-shaped vibrator element like that which is used in the present invention, the frequency of the vibrations is given by the following relationship:

$$f = \frac{K}{2\pi} \times \frac{e}{L^2} \sqrt{\frac{E}{\delta}}$$

K = coefficient required by taking into account the masses on the arms of the vibrator element (between 0.5 and 1)
e = thickness of the branches of the vibrator element
L = length of the branches of the vibrator element
δ = mass/volume of the material from which the vibrator element is made
E = modulus of elasticity From the above, it is quite evident that all variation in the modulus of elasticity is translated immediately into a corresponding variation in the frequency of the oscillator.

Any material which possesses an adjustable thermoelastic coefficient and permits electromagnetic maintenance of vibrations may be used to form the vibrator element. The material used in the preferred embodiment of the invention is Elinvar, manufactured in France, but Ni Span C, widely used in the United States, is an appropriate substitute.

Elinvar is an alloy based on iron containing, by way of indication, 34 to 36.5 percent nickel, 6.5 to 9.5 percent chromium, 2.6 to 3.5 percent tungsten, 2 percent manganese, 0.65 to 0.75 percent carbon. Ni Span C is an alloy based on iron containing, by way of indication, 41 percent nickel, 2 percent titanium, 0.3 aluminum, 5.1 percent chromium.

In the preferred embodiment, when screw 22 is entirely disengaged (the condition shown in FIG. 2), magnet 10 lies directly centered between branches 4 and 4a of the tuning fork, and consequently the magnetic field is at a maximum while the modulus of elasticity of the vibrator arms (Young's E modulus) is at a minimum. In this condition, the frequency of the oscillator is also at a minimum.

On the other hand, when screw 22 is engaged at its maximum distance in the direction of arrow A (FIG. 2), a part of the magnetic field directly passes magnets 7 and 8 towards magnet 10, thus diminishing the magnetic field in branches 4 and 4a. Under these conditions, the modulus of elasticity is maximized along with the frequency of the oscillator.

Figure 3:
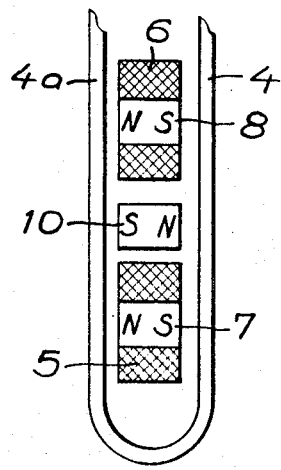
FIG. 3 is a fragmentary view in detail of the coils and the magnet located between the branches of the tuning fork.

FIG. 3 indicates the polarity of magnet 10 in relation to magnets 7 and 8. By this arrangement, magnet 10 assures the closure of the magnetic field of magnets 7 and 8 by the branches 4 and 4a of the oscillator.

In FIG. 8, there is shown a preferred arrangement for the mounting of magnet 10 on spring member 20, wherein the magnet is glued at 25 in an elbow which is formed by a bend in the spring member.

In operation, the signal taken from sensing coil 5 is applied, after amplification by the amplifier 9, to the actuating coil 6 which, in turn, causes the vibrator element to vibrate. The frequency of oscillation, as previously described, can be altered by moving the magnet 10; this movement varying the magnetic field in the arms 4 and 4a of element 1, causing a corresponding variation in the frequency of oscillation of the device.

The present invention can be adapted to drive a system of wheels by transforming the reciprocating rectilinear displacement thereof into continuous rotational movement. This can be done, in known manner, by means of a magnetic escapement device essentially comprising a permanent magnet fixed to the end of one of the branches of vibrator element 1, and an escapement wheel of magnetic material disposed between the poles of the magnet. The wheel has a track thereon in which radial teeth are cut; the teeth being disposed to either side of a wheel rim. When the wheel is initially set in motion in a desired direction and with a convenient speed of rotation, it is synchronized by the vibration of the element 1 by means of the magnet which constantly exerts an attraction on the side face of the wheel.

The present invention contemplates the inclusion therein of means for the combination thereof with a magnetic escapement device as described above. A C-shaped guiding magnet 14 is mounted on branch 4 of the tuning fork, and, in known manner, an escapement wheel 17 of magnetic material (having a track in which radial teeth are cut disposed to either side of the groove so that the escapement wheel is driven in rotation by magnet 14 when it is subjected to vibration of the arm 4) is disposed between the poles 16 and 16a of the magnet.

A balancing mass 18 is fixed on a second ring 19 slidably mounted on the arm 4a of the element 1; the magnet 14 and the mass 18 having equal weights in order to preserve the symmetry of the vibrator.

The two pieces 14 and 18 are always displaced simultaneously along the branches of the vibrator element in order to maintain an identical length of the two branches. It is well known in the art to make these pieces from materials best suited for the use to which the vibrator is adapted. Thus, a lengthy listing thereof would appear to be unnecessary.

Rings 15 and 19 of the magnet and weight, respectively, are constructed in a manner which allow them to be slidable up and down the branches of the tuning fork, yet also permit secure tightening thereof so that, whatever the final position chosen, the stability of the frequency of the oscillator will be guaranteed. In this regard, it should be noted that the frequency of the oscillator may be adjusted within large limits by simply moving the masses mounted on the vibrator branches. Thus, course adjustment of the oscillator frequency may be obtained in this manner, and fine adjustment of the frequency may be obtained through adjusting magnet 10 with screw 22.

The details of rings 15 and 19 may be discerned by referring to FIGS. 4, 5, and 6. Referring to FIGS. 4 and 5, it can be seen that ring 15 is indented at 26 so that the interior space therein may be represented by the formula $(e - \epsilon)$ wherein $e$ represents the thickness of a branch of the oscillator (e.g., 4 in FIG. 4) and $\epsilon$ represents the amount indentation 26 exceeds thickness $e$. Parameter $\epsilon$ is adjusted according to the degree of frictional engagement desired between the ring and the arm upon which it is capable of moving.

Note from FIG. 4 that the ring may be grooved as at 27. In so doing, it is simple to initially install the ring.

It should be equally noted that FIG. 4 (inserted to facilitate comprehension) presents a very important relationship between pieces 4 and 15 in certain localities. In the embodiment proposed, $\epsilon$ does not exceed 3 percent of the thickness $e$ of the branches of the vibrator element; the ring 15 therefore enclosing completely branch 4, and being perfectly guided thereby.

Moreover, ring 15 is constructed primarily from an inoxidizable, nonmagnetic steel and is formed according to FIG. 5. It constitutes therefore a strong spring which assures considerable pressure on the branch of the vibrator element. It is this pressure which, while permitting sliding accompanied by great friction along the branches at the time of the adjustment of the frequency, assures the fixation of the masses 14 and 18 in a manner simpler and altogether more effective than that obtained using screw means or glue.

As can readily be seen, such rings are easy to assemble, and the indentation therein may be made by a press during initial formation of the ring, or in a subsequent operation.

The above-described assembly allows a particularly simple adjustment of the frequency of the vibratory element 1 to be effected, and avoids the delicate and permanent adjustment normally made, consisting of decreasing the actual length of the arm 4 and 4a of element 1 by, for example, a grinding operation. In practice, it is not necessary to remove the vibrator from its support members 2 and 23, but the two rings 15 and 19 may be slidingly moved while element 1 rests immobile on its supporting member. In this way, the result of the modification incurred by such movement can be easily evaluated on appropriate measuring apparatus without having to provide separate supporting means. Subsequently, the final adjustment of the oscillating frequency to the exact desired value may be effected by moving the magnet 10 with screw 22 or an equivalent device.

Finally, it should be pointed out that the present invention is simple and economical to fabricate. The U-shaped tuning fork may be formed using a commercial roller in constant section. After being cut to a predetermined length, bars of Elinvar or other appropriate material are bent in the shape of a U to obtain vibrators having a weak frequency dispersion. Furthermore, it can be seen from the foregoing description of the invention that the other components of the assembly may be easily fabricated as well, and the entire assembly is simple to put together and adjust.

Having thus described my invention, I claim:

1. A mechanical oscillator comprising: a two-armed vibrator element; an electrical vibration sensing coil; said coils being disposed between the arms of the vibrator element; a magnet, said magnet being movable between said windings along an axis perpendicular to the axis of the tuning fork; a C-shaped magnet mounted on one of the arms of said vibrator element; a balancing weight mounted on the other arm of said vibrator element; an electronic amplifier adapted to receive signals from said sensing coil and feed them to the actuating coil to control the vibrations of said vibrator element; and an escape wheel of magnetic material mounted relative to the poles of said C-shaped magnet so as to rotate in response to the vibrations of said vibrator element.

2. The device of claim 1 wherein said C-shaped magnet, and said balancing weight are rigidly connected to movable locking means for allowing said magnet and said weight to slide on said arms and rigidly lock in a desired position.

3. The oscillator of claim 2 wherein said movable locking means comprise rings indented at at least one position, the space between the inside edge of said indentation and the interior of the opposite side of the rings being less than the width of an arm of said vibrator element.

4. The mechanical oscillator of claim 3 wherein said indentation is grooved at at least one position in order to facilitate placement of said ring on an arm of said vibrator element.

5. The oscillator of claim 1 wherein said magnet adapted to pass between said coils is spring-biased against adjusting means adapted to change the relative position of said magnet with respect to said coils.

6. The mechanical oscillator of claim 5 wherein said adjusting means comprises screw means adapted to move said magnet, and locking means adapted to prevent said screw means from being displaced under the effect of vibrations.

7. The mechanical oscillator of claim 5 wherein said adjusting means comprises a longitudinally movable screw adapted to bear against the means for spring biasing said magnet, and a lock nut through which said screw passes, said nut being adapted to prevent said screw from being displaced under the effect of vibrations.